(12) United States Patent
Tava et al.

(10) Patent No.: US 9,170,121 B2
(45) Date of Patent: Oct. 27, 2015

(54) MOTOR VEHICLE NAVIGATION SYSTEM

(75) Inventors: Marcello Tava, Munich (DE); Roman Berger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 969 days.

(21) Appl. No.: 12/578,405

(22) Filed: Oct. 13, 2009

(65) Prior Publication Data
US 2010/0094540 A1    Apr. 15, 2010

Related U.S. Application Data

(63) Continuation of application No. PCT/EP2008/002403, filed on Mar. 27, 2008.

(30) Foreign Application Priority Data

Apr. 12, 2007    (DE) .......................... 10 2007 017 174

(51) Int. Cl.
*G01C 21/36*    (2006.01)

(52) U.S. Cl.
CPC ........ *G01C 21/3629* (2013.01); *G01C 21/3641* (2013.01)

(58) Field of Classification Search
CPC .................. G01C 21/3641; G01C 21/3629
USPC .................. 701/202, 209, 201; 340/990, 995
See application file for complete search history.

(56) References Cited

U.S. PATENT DOCUMENTS

| | | | |
|---|---|---|---|
| 5,508,930 A * | 4/1996 | Smith, Jr. ...................... | 701/201 |
| 5,508,931 A * | 4/1996 | Snider ............................ | 701/207 |
| 5,638,280 A * | 6/1997 | Nishimura et al. ........... | 701/418 |
| 6,216,086 B1 * | 4/2001 | Seymour et al. .............. | 701/202 |
| 6,317,685 B1 * | 11/2001 | Kozak et al. .................. | 701/210 |
| 6,321,161 B1 * | 11/2001 | Herbst et al. ................. | 701/210 |
| 6,405,130 B1 * | 6/2002 | Piwowarski ................... | 701/210 |
| 6,735,519 B1 | 5/2004 | Han | |
| 7,702,456 B2 * | 4/2010 | Singh ............................ | 701/425 |
| 7,707,456 B2 * | 4/2010 | Tanaka et al. ................ | 714/6.11 |

(Continued)

FOREIGN PATENT DOCUMENTS

| | | |
|---|---|---|
| DE | 197 28 470 A1 | 1/1999 |
| DE | 103 26 042 A1 | 12/2004 |

(Continued)

OTHER PUBLICATIONS

German Search Report dated Jan. 17, 2008 including partial English translation (Nine (9) pages).
International Search Report dated Jul. 2, 2008 including English translation (Four (4) pages).

*Primary Examiner* — Tuan C. To
(74) *Attorney, Agent, or Firm* — Crowell & Moring LLP

(57) ABSTRACT

A motor vehicle navigation system and method uses an output device for the acoustic output of driving maneuver information and a processor device which is equipped such that a route to be traveled is determined. Driving maneuver information is determined based on the route to be traveled and on an actual position. An alternate route is computed, assuming that the determined driving maneuver information is not observed. As a function of the difference between the route and the alternate route, particularly with respect to the expected driving time, driving distance and/or driving cost, the driving maneuver information is either acoustically emitted or not.

12 Claims, 2 Drawing Sheets

(56) References Cited

U.S. PATENT DOCUMENTS

| | | |
|---|---|---|
| 2002/0143464 A1* | 10/2002 | Blewitt .................. 701/202 |
| 2002/0165667 A1 | 11/2002 | Lee |
| 2005/0021227 A1* | 1/2005 | Matsumoto et al. .......... 701/207 |
| 2005/0149252 A1 | 7/2005 | Brulle-Drews |
| 2006/0129310 A1* | 6/2006 | Tarrant et al. ................. 701/201 |
| 2007/0061071 A1* | 3/2007 | Torii ............................ 701/209 |
| 2007/0244637 A1* | 10/2007 | Singh ........................... 701/209 |
| 2009/0222201 A1 | 9/2009 | Jung |

FOREIGN PATENT DOCUMENTS

| | | |
|---|---|---|
| DE | 10 2005 057 263 A1 | 6/2007 |
| EP | 1 528 362 A1 | 5/2005 |
| JP | 2004-317275 A | 11/2004 |
| JP | 2006189415 A * | 7/2006 |
| WO | WO 2006094568 A1 * | 9/2006 |
| WO | WO 2007/012513 A1 | 2/2007 |

* cited by examiner

MOTOR VEHICLE NAVIGATION SYSTEM

CROSS-REFERENCE TO RELATED APPLICATIONS

This application is a continuation of PCT International Application No. PCT/EP2008/002403, filed Mar. 27, 2008, which claims priority under 35 U.S.C. §119 to German Patent Application No. DE 10 2007 017 174.0, filed Apr. 12, 2007, the entire disclosures of which are herein expressly incorporated by reference.

BACKGROUND AND SUMMARY OF THE INVENTION

The invention relates to a motor vehicle navigation system.

Navigation systems are known which automatically compute a route to be traveled, as a function of a starting position or an actual position, of selected route criteria (fast, short, expressway preferred, . . . ), and of a destination.

For example, before an intersection is reached at which, corresponding to the route, a turn to the right has to be made, the driving maneuver information "please turn to the right in 300 meters" is determined as a function of the actual position and the route to be traveled and is acoustically emitted by way of a corresponding output device, for example, by use of synthetized language.

Such acoustically emitted driving maneuver information may be extremely disturbing to a driver, especially in the city and on routes known per se. However, a deactivation of the acoustic output may, for example, later on in the route, have the result that an important expressway exit ramp is missed, which may lead to a long detour.

It is now an object of the invention to provide a motor vehicle navigation system by which a user is acoustically informed concerning imminent driving maneuvers according to specified requirements.

This object is achieved by a motor vehicle navigation system and method of operating same having an output device for the acoustic output of driving maneuver information. A processor device is equipped such that a route to be traveled is determined. Driving maneuver information is determined based on the route to be traveled and on the actual position. At least one alternate route is computed, assuming that the determined driving maneuver information is not observed and, as a function of the difference between the route and the alternate route, particularly with respect to at least one of an expected driving time, driving distance and driving cost, a determination is made whether or not to acoustically emit driving maneuver information. Advantageous further developments of the invention are described herein.

The invention thus automatically emits driving maneuver information acoustically only when its non-observance would, for example, result in a large detour or in a considerable prolongation of the driving time.

A motor vehicle navigation system according to the invention has an output device for the acoustic output of driving maneuver information and a processor device which is equipped such that a route to be traveled is determined. Based on the route to be traveled and the actual position, in particular, for the street or road junction to be traveled next (intersection, branching-off, exit ramp, entrance ramp, . . . ), driving maneuver information (or an imminent driving maneuver) is determined. At least one alternate route, particularly to the same driving destination and/or while assuming the same route criteria, is computed, assuming that the determined driving maneuver information is not observed (or the determined driving maneuver is not carried out). As a function of the difference between the route and the alternate route, particularly with respect to the expected driving time, the driving distance and/or the driving cost, the driving maneuver information (or information concerning the determined driving maneuver) is either acoustically emitted or not.

In this case, the alternate route may or may not contain reversing maneuvers or turning maneuvers. In addition or as an alternative, the difference between the route and the alternate route may also relate to the distance of the route or the alternate route from at least one point of interest (gas station, museum, etc. . . . ).

If the road junction of concern is an exit ramp, as a rule, the computation of one alternate route will be sufficient. In the case of other streets or road junctions, the determination of several alternate routes may be advantageous. As required, in addition to the route and the alternate route, additional routes are therefore computed, which may result from the non-observance of the driving maneuver information, particularly for the street or road junction to be traveled next. For example, when approaching an intersection of two roads, in addition to the route which, for example, indicates a turning-off to the left, a first alternate route may be computed, in the case of which it is assumed that the vehicle will turn to the right, and a second alternate route may be computed, in the case of which it is assumed that the vehicle will drive straight ahead. Then, preferably the differences are determined between the route and the alternate routes, particularly with respect to the expected driving time, driving distance and/or driving cost, and the thereby determined maximal difference is used as a condition for the decision as to whether the driving maneuver information (or information concerning the determined driving maneuver) ("please turn to the left") is either acoustically emitted or not.

As a result, it is achieved that, when the motor vehicle navigation system is correspondingly adjusted, a driver will be disturbed only by the acoustic output of that driving maneuver information whose non-observance would result in a considerable increase of the driving distance or driving time, such as may occur if an exit ramp is missed.

According to an embodiment of the invention, it is provided that a straight-ahead driving maneuver, particularly on the expressway or before an exit ramp, is not considered to be a driving maneuver within the scope of the invention, and/or that corresponding driving maneuver information is basically not emitted within the scope of the invention, particularly on an expressway or before an exit ramp. Particularly on an expressway or before an exit ramp, preferably no alternate route and/or no difference will then be computed and/or no acoustic driving maneuver information will then be emitted, if the driving maneuver is the "straight-ahead" route.

It is preferably provided that driving maneuver information will be acoustically emitted when the difference between the route and the alternate route exceeds a predetermined limit value, particularly with respect to the expected driving time, driving distance and/or driving cost.

As an alternative or in addition, it is provided that driving maneuver information will not be acoustically emitted when the difference between the route and the alternate route does not exceed a predefined limit value, particularly with respect to the expected driving time and/or driving distance.

In addition, particularly preferably, an output device for the visual output of driving maneuver information is provided, the driving maneuver information being emitted independently of the difference between the route and the alternate route, particularly with respect to the expected driving time, driving distance and/or driving cost. A driver will thereby be definitely informed in a visual manner concerning imminent driving maneuvers. This manner of output is not as disturbing as the acoustic output.

Advantageously, an operator can adjust the limit value by use of an adjusting device in order to adapt the automatic suppression of the acoustic output to the user's needs.

A preferred further development of the invention provides that, as a function of the respective difference between the route and the alternate route, particularly with respect to the expected driving time, driving distance and/or driving cost, the driving maneuver information is divided into different driving maneuver information classes, and that driving maneuver information is either acoustically emitted or not as a function of its driving maneuver information class.

At least one driving maneuver information class, whose pertaining driving maneuver information is either to be acoustically emitted or not, can preferably be selected by an operator by use of a selecting device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
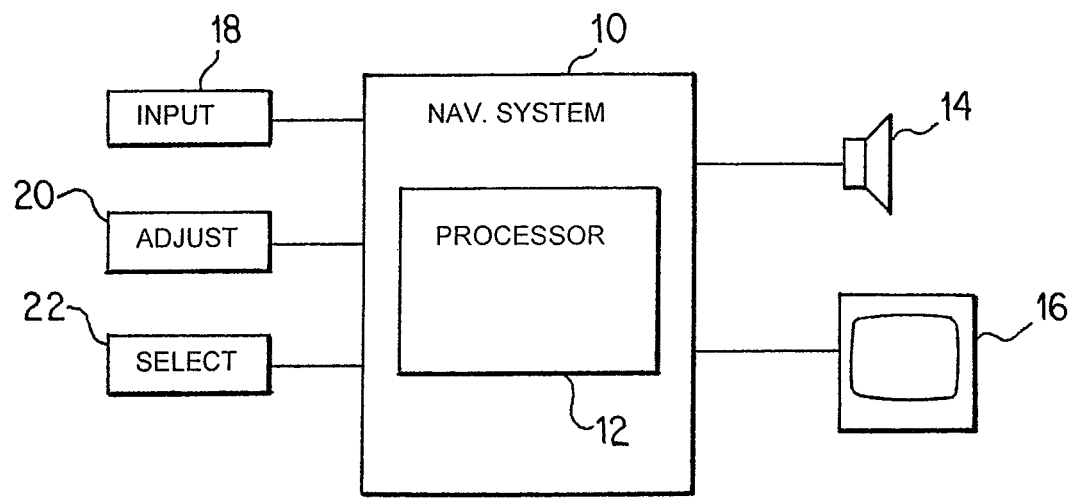
FIG. 1 is a simplified block diagram of a navigation system.

Referring to FIG. 1, there is shown a simplified navigation system (10) including a processor (12), audio output device (14) and visual output device (16). The navigation system (10) receives various inputs in order to operate as is well known in the art. For example, an input (18) can be used to activate the functions of the navigation system including the input of destinations and various settings. In accordance with the embodiment described below, an adjusting device (20) and selecting device (22) may also be provided separately or in combination with the operator input (18).

Figure 2:
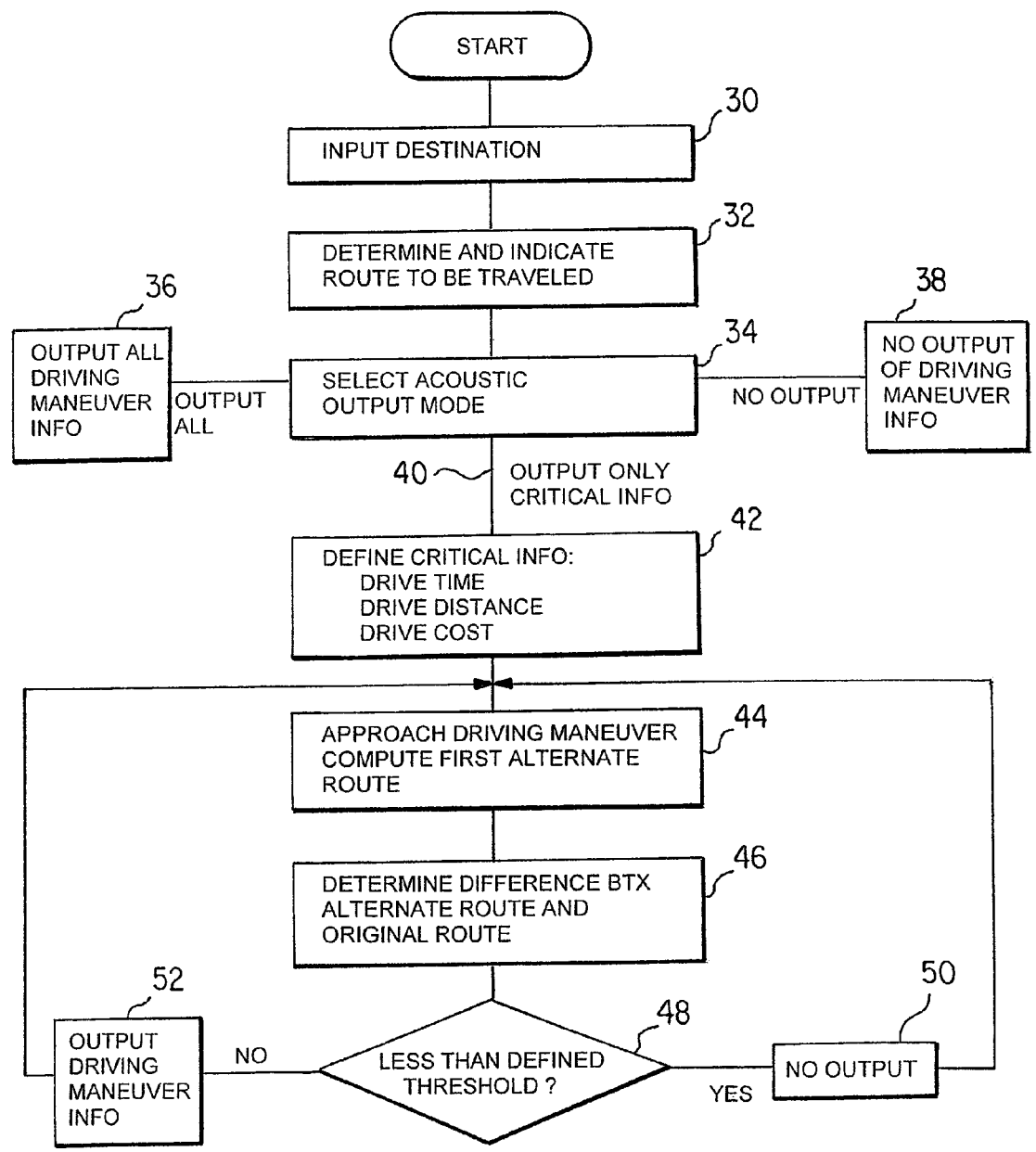
FIG. 2 is a simplified flow chart illustrating an exemplary method of operating the vehicle navigation system.

In an exemplary embodiment shown in FIG. 2 of a method for operating the navigation system, a driver first inputs the driving destination (step 30) by way of an input device (18) of the motor vehicle navigation system. Based on this driving destination and the actual position, the motor vehicle navigation system determines a route to be traveled and indicates it on a display device (step 32).

It is now possible for the driver to make a choice between different options with respect to the acoustic output of driving maneuver information (step 34):
- acoustic output of all determined driving maneuver information (step 36),
- no acoustic output of driving maneuver information (step 38),
- output of only the critical driving maneuver information (step 40).

When the driver selects the option "output of only the critical driving maneuver information", he can define the critical driving maneuvers with respect to the driving time difference and/or the route difference in the next step (step 42).

In this example, it is assumed that the driver adjusts the motor vehicle navigation system such that driving maneuver information will be acoustically emitted only when the expected driving time difference between the route to be traveled and an alternate route (see below) is longer than three minutes, or when the route difference between the route to be traveled and an alternate route is longer than 5 kilometers.

It is now assumed that the vehicle is approaching a branching-off on the route to be traveled. The motor vehicle navigation system determines that the driving maneuver "turn off to the right" is to be carried out at this branching-off according to the determined route, and the corresponding driving maneuver information "please turn to the right in 300 meters" is to be emitted. The motor vehicle navigation system automatically computes a first alternate route assuming that the driving maneuver "turn off to the right" is not carried out by the driver (step 44). Between the alternate route and the original route, there is a difference of 2 minutes with respect to the expected driving time and of 3 kilometers with respect to the route (step 46). These differences are smaller than the predefined differences (limit values) of 3 minutes and 5 kilometers respectively (step 48). Therefore, no acoustic output of the corresponding driving maneuver information "please turn to the right in 300 meters" takes place (step 50).

It is now assumed that the vehicle will later approach an expressway ramp on the route to be traveled. The motor vehicle navigation system determines that, according to the determined route (this may now also be the previously determined first alternate route), the driving maneuver "exit from the expressway" is to be carried out at this express-way exit ramp, and the corresponding driving maneuver information "please exit the expressway in 300 meters" is to be emitted. The motor vehicle navigation system automatically computes a second alternate route, assuming that the driving maneuver "exit from the expressway" was not carried out by the driver (step 44). A difference arises between the second alternate route and the route (or the first alternate route) with respect to the driving time of 5 minutes and with respect to the distance of 4 kilometers (step 46). Because the driving time difference is greater than the predefined difference of 3 minutes, an acoustic output of the corresponding driving maneuver information "please exit from the expressway in 300 meters" therefore takes place (step 52).

It is also contemplated that different types of driving maneuver information are provided, for example, as a function of the distance between the driving maneuver position and the actual position, and that the invention is used only in the case of a certain type of driving maneuver information, or that the invention is not used in the case of a certain type of driving maneuver information.

Depending on the road or driving situation, for example, the use of the invention can be activated or deactivated automatically or manually by a user. Accordingly, motor vehicle navigation systems and methods which, not necessarily before each road junction, provide a difference-dependent acoustic output of driving maneuver information are within the scope of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle navigation system, comprising:
an acoustic output device for outputting acoustic driving maneuver information; and a processor operatively configured to:
  determine a route to be traveled,
  determine driving maneuver information based on the route to be traveled and an actual position,
  compute at least one alternate route based on an assumption that the determined driving maneuver information is not followed, and
  determine whether or not to acoustically emit via the acoustic output device the determined driving maneuver information as a function of a difference between the route to be traveled and the alternate route with respect to at least one of an expected driving time, driving distance, and driving cost, wherein:
  the determined driving maneuver information is acoustically emitted only if at least one of the expected driving time, driving distance, and driving cost of the alternate route exceeds the respective at least one of the expected driving time, driving distance, and driving cost of the route to be traveled by at least a predefined value, and
  the determined driving maneuver information is not acoustically emitted if the at least one of the expected driving time, driving distance, and driving cost of the alternate route does not exceed the respective at least one of the expected driving time, driving distance, and driving cost of the route to be traveled by at least the predefined value.

2. The motor vehicle navigation system according to claim 1, further comprising:
  a visual output device providing a visual output of driving maneuver information; and
  wherein the determined driving maneuver information is output visually independent of the difference between the route to be traveled and the alternate route.

3. The motor vehicle navigation system according to claim 1, further comprising an operator adjusting device operatively configured to allow an operator to adjust the predefined value.

4. The motor vehicle navigation system according to claim 1, wherein as a function of the difference between the route and the alternate route with respect to at least one of the driving time, driving distance and driving cost, the determined driving maneuver information is dividedable into different driving maneuver information classes, and wherein the determined driving maneuver information is acoustically emitted or not as a function of a respective driving maneuver information class.

5. The motor vehicle navigation system according to claim 4, further comprising a selection device operatively configured for an operator to select at least one driving maneuver information class whose associated determined driving maneuver information is to be acoustically emitted.

6. The motor vehicle navigation system according to claim 4, further comprising a selection device by which an operator selects at least one driving maneuver information class whose associated determined driving maneuver information is not to be acoustically emitted.

7. A method of operating a motor vehicle navigation system having an acoustic output device for acoustically outputting driving maneuver information and a processing device operatively configured to determine a route to be traveled along with driving maneuver information based on the route to be traveled and an actual position, the method comprising the acts of:
  determining the route to be traveled,
  determining the driving maneuver information based on the route to be traveled and the actual position,
  computing at least one alternate route to the route to be traveled based on an assumption that a determined driving maneuver information will not be followed;
  determining a difference between the route to be traveled and the alternate route with respect to at least one of an expected drive time, drive distance, and drive cost; and
  determining whether or not to acoustically emit the determined driving maneuver information as a function of the determined difference, wherein:
  the determined driving maneuver information is acoustically emitted only if at least one of the expected driving time, driving distance, and driving cost of the alternate route exceeds the respective at least one of the expected driving time, driving distance, and driving cost of the route to be traveled by at least a predefined value, and
  the determined driving maneuver information is not acoustically emitted if the at least one of the expected driving time, driving distance, and driving cost of the alternate route does not exceed the respective at least one of the expected driving time, driving distance, and driving cost of the route to be traveled by at least the predefined value.

8. The method according to claim 7, further comprising the act of outputting the determined driving maneuver information visually independent of the determined difference between the route to be traveled and the alternate route.

9. The method according to claim 7, further comprising the act of adjusting the predefined value in response to an operator input.

10. The method according to claim 7, further comprising the acts of:
  dividing the determined driving maneuver information into different driving maneuver information classes as a function of a respective difference between the route to be traveled and the alternate route with respect to at least one of the expected drive time, drive distance, and drive cost; and
  determining whether or not to acoustically output the determined driving maneuver information as a function of its respective driving maneuver information class.

11. The method according to claim 10, further comprising the act of selecting, in response to an operator input, at least one driving maneuver information class whose associated determined driving maneuver information is to be emitted acoustically.

12. The method according to claim 11, further comprising the act of selecting, in response to an operator input, at least one driving maneuver information class whose associated determined driving maneuver information is not to be emitted acoustically.

* * * * *